US008060917B2

(12) United States Patent
Chung et al.

(10) Patent No.: US 8,060,917 B2
(45) Date of Patent: Nov. 15, 2011

(54) SYSTEM AND METHOD FOR HOSTING MULTIPLE KERBEROS SERVICE PRINCIPAL NAMES

(75) Inventors: Hyen-Vui Chung, Round Rock, TX (US); Derek W. Ho, Austin, TX (US); David L. Leigh, Chapel Hill, NC (US); Michael J. McMahon, Apex, NC (US); Rengan Sundararaman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 12/104,222

(22) Filed: Apr. 16, 2008

(65) Prior Publication Data

US 2009/0265771 A1  Oct. 22, 2009

(51) Int. Cl.
*H04L 9/32* (2006.01)
*H04L 9/00* (2006.01)
*G06F 7/04* (2006.01)

(52) U.S. Cl. ............. 726/5; 726/3; 726/4; 726/6; 726/7; 713/168; 713/169; 713/170; 713/171; 713/172

(58) Field of Classification Search ................. 726/5
See application file for complete search history.

(56) References Cited

U.S. PATENT DOCUMENTS 7,734,647 B2 * 6/2010 Suhonen et al. ............. 707/781
2003/0212887 A1 * 11/2003 Walther et al. ............... 713/151

* cited by examiner

*Primary Examiner* — Longbit Chai
(74) *Attorney, Agent, or Firm* — Jeffrey T. Holman (57) ABSTRACT

An authentication system and method for allowing an administrator to host a plurality of service principal names (SPNs) over a common network port of a backend server. The authentication system includes a client computer, a backend server, and a service principal name (SPN) apparatus. The client computer sends an authentication request to the backend server. The backend server performs an authentication procedure in response to a reception of the authentication request from the client computer. The SPN apparatus configures a plurality of service SPNs for the web service application over the common network port.

26 Claims, 5 Drawing Sheets

SYSTEM AND METHOD FOR HOSTING MULTIPLE KERBEROS SERVICE PRINCIPAL NAMES

BACKGROUND

Kerberos is the name of a computer network authentication protocol, which allows individuals communicating over a network to prove their identity to one another in a secure manner. The kerberos protocol provides strong authentication using secret key cryptography. Web-Services Security (WS-Security) is a specification to secure and authenticate network communications using Simple Object Application Protocol (SOAP). SOAP is a protocol for exchanging Extensible Markup Language (XML)-based messages over computer networks, typically using Hypertext Transfer Protocol/Hypertext Transfer Protocol over Secure Socket Layer (HTTP/HTTPS). SOAP forms the foundation layer of the web services protocol stack providing a basic messaging framework upon which abstract layers can be built.

In order to effectively host multiple web service provider applications using WS-SecurityKerberos, the application provider framework provides a way for security administrators to configure a service principal name (SPN) for an application. Conventional solutions, such as implemented within the NET framework, tie the SPN to the Transfer Control Protocol/Internet Protocol (TCP/IP) port on which the web service application is listening. Hence, conventional solutions use a unique and/or dedicated port for each application which uses a unique SPN. Using a unique port for each application creates additional difficulties when the topology involves a web service gateway or proxy, and/or when the web service providers are clustered. These difficulties might include managing multiple ports, opening multiple ports in the firewall, and exhaustion of port resources.

SUMMARY

Embodiments of a method are described. In one embodiment, the method is a method for configuring a service principal name (SPN) as part of an authentication procedure. The configuration method includes hosting a web service application on a backend server. The configuration method allows an administrator to host the plurality of SPNs on the backend server over a common network port. The configuration method also includes configuring a security binding SPN as part of a security binding associated with the web service application and to configure another security binding associated with the client to use the security binding SPN for access to the web service application. The configuration method also includes configuring a login module SPN as part of a login module. The configuration method also includes configuring an entry in a keytab file as a default SPN, wherein the keytab file is a file to store SPN entries, and wherein a first SPN listed in the keytab file comprises the default entry in the keytab file. The configuration method also includes hosting multiple instances of a login module. The configuration method also includes configuring each instance of the login module with a different login module SPN. The configuration method also includes configuring the web service application to use a predetermined instance of the login module. The configuration method also includes utilizing the login module SPN associated with the predetermined instance of the login module. Other embodiments of the method are also described.

In one embodiment, the method is a method for authenticating an SPN as part of an authentication procedure. The authentication method includes reading a keytab file having a plurality of SPNs associated with a web service application. The authentication method preloading information about each SPN in the keytab file that is supported by the web service application. The authentication method also includes performing an authentication procedure in response to a reception of an authentication request from a client to access a web service application over a common network port on a backend server. The authentication method also includes checking the authentication request for a corresponding SPN. The authentication method also includes verifying the authentication request according to a selected SPN.

Additionally, the authentication method includes checking a web service application security binding for a configured security binding SPN in response to the request for authentication from the client. The security binding SPN is selected in response to a determination that the security binding SPN is configured as part of the web service application security binding and the authentication request is verified according to the security binding SPN. The authentication method also includes checking a login module for a configured login module SPN in response to a determination that a security binding SPN is not configured as part of a web service application security binding. The login module SPN is selected in response to a determination that the login module SPN is configured as part of the login module and the authentication request is verified according to the login module SPN. The authentication method also includes selecting a default SPN in the keytab file in response to a determination that a login module SPN is not configured as part of a login module and that a security binding SPN is not configured as part of a web service application security binding. The authentication request is verified according to the default SPN. The authentication method also includes creating a corresponding security context in response to a verification of the authentication request according to the selected SPN reference. The corresponding security context corresponds to the authentication request, and wherein the corresponding security context comprises a security credential associated with a user account. The authentication method also includes caching the corresponding security context in a memory device for reuse according to a security credential lifetime. The security credential lifetime is a predetermined time period in which the security credential is enabled and active.

Embodiments of a system are also described. In one embodiment, the system is an authentication system. The authentication system includes a client computer, a backend server, and a service principal name (SPN) apparatus. The client computer sends an authentication request to the backend server. The backend server performs an authentication procedure in response to a reception of the authentication request from the client computer. The SPN apparatus configures a plurality of service SPNs for the web service application to allow an administrator to host the plurality of SPNs over a common network port of the backend server. Other embodiments of the system are also described.

Embodiments of an apparatus are also described. In one embodiment, the apparatus is a SPN apparatus. The SPN apparatus includes means for configuring a security binding SPN as part of a security binding associated with the web service application. The SPN apparatus also includes means for configuring another security binding associated with the client to use the security binding SPN for access to the web service application. The SPN apparatus also includes means for selecting the security binding SPN in response to a determination that the security binding SPN is configured as part of the web service application security binding.

Additionally, the SPN apparatus includes means for configuring a login module SPN as part of a login module. The SPN apparatus also includes means for selecting the login module SPN in response to a determination that the login module SPN is configured as part of the login module. The SPN apparatus also includes means for configuring a default SPN as part of an entry in a keytab file. The keytab file is a file to store SPN entries. The first SPN listed in the keytab file is designated the default entry in the keytab file. The SPN apparatus also includes means for selecting the default SPN in the keytab file in response to a determination that the login module SPN is not configured as part of the login module and that the security binding SPN is not configured as part of the web service application security binding. Other embodiments of the apparatus are also described.

Other aspects and advantages of embodiments of the present invention will become apparent from the following detailed description, taken in conjunction with the accompanying drawings, illustrated by way of example of the principles of the invention.

BRIEF DESCRIPTION OF THE SEVERAL VIEWS OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments allow an administrator to host multiple service principal names (multi-SPN) on an application provider over a common network port. Thus, web service applications running on the same application server and utilizing a common network port may use a unique SPN without being dependent on a particular port. In some of the described embodiments the security bindings for a client are pre-configured to use a specific SPN for accessing a web service provider application protected with kerberos security. The kerberos solution uses the SPN from the SOAP binding to generate or consume the kerberos token. In some of the described embodiments, a web services server reads a keytab file and preloads information about each of the supported SPNs that are in the keytab file. The kerberos keytab file stores the information associated with each supported SPN. During request processing for a specific SPN, a corresponding security context is created and cached for reuse. In some embodiments, default SPN utilization is implemented to minimize configuration complexity. Some of the described embodiments allow a server to host multiple instances of a login module. Each login module is configured with a different login module SPN. The provider applications may then be configured to use a given login module and thereby utilize the login module SPN associated with that login module.

Figure 1:
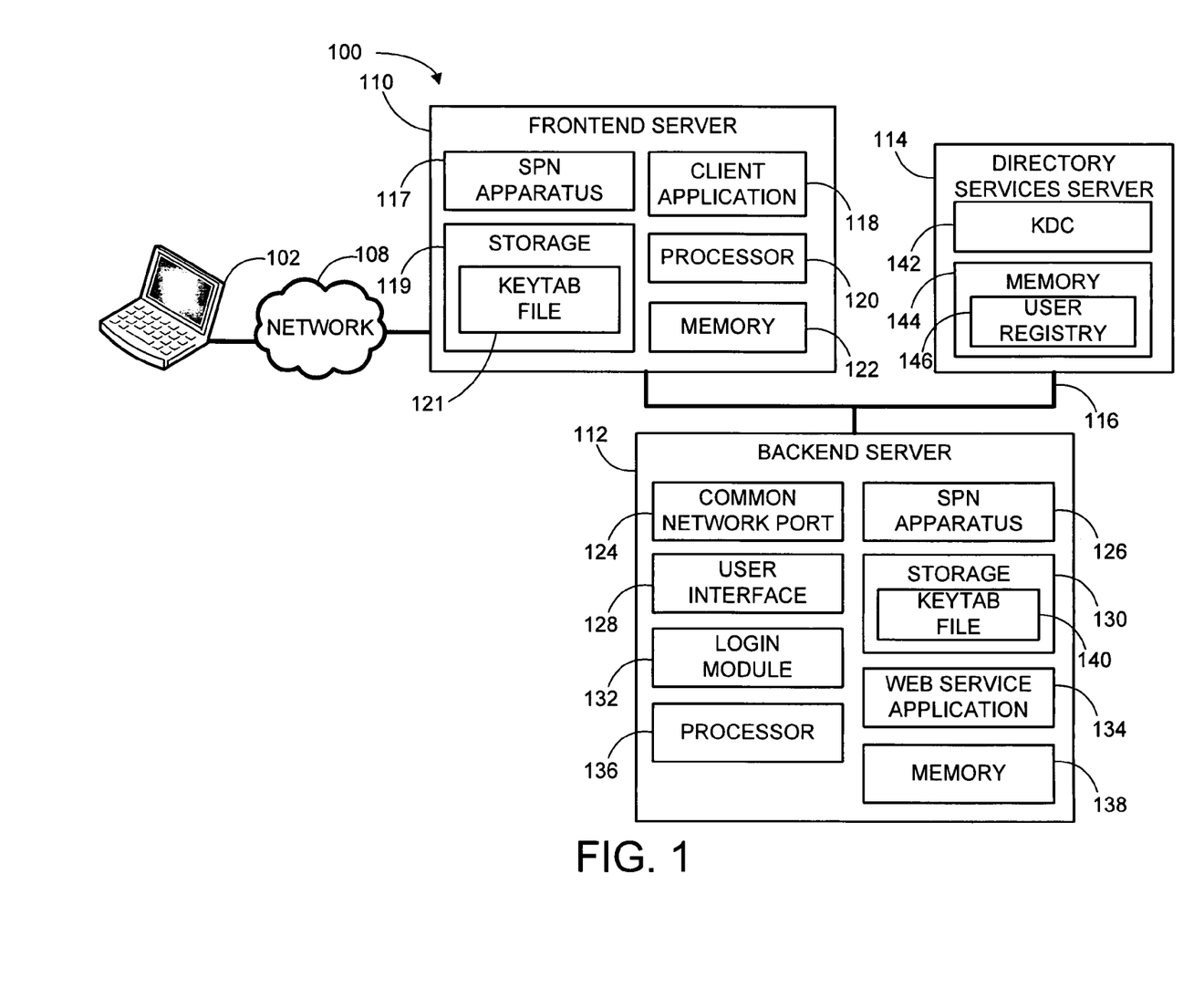
FIG. 1 depicts a schematic block diagram of one embodiment of an unmanaged client system.

FIG. 1 depicts a schematic block diagram of one embodiment of an unmanaged client system 100. The illustrated unmanaged client system 100 includes an unmanaged client computer 102, a network 108, a frontend server 110, a backend server 112, and a directory services server (DSS) 114. The frontend server 110, the backend server 112, and the DSS 114 are connected by a backend network 116. Although the depicted unmanaged client system 100 is shown and described herein with certain components and functionality, other embodiments of the unmanaged client system 100 may be implemented with fewer or more components or with less or more functionality. For example, some embodiments of the unmanaged client system 100 may include a plurality of unmanaged client computers 102 and a plurality of networks 108. Additionally, some embodiments of the unmanaged client system 100 may include similar components arranged in another manner to provide similar functionality, in one or more aspects.

The unmanaged client computer 102 manages the interface between a user and the frontend server 110. In one embodiment, the unmanaged client computer 102 is a desktop or laptop computer. In some embodiments, the client computer 102 is a mobile computing device that allows the user to connect to the frontend server 110. In some embodiments, the unmanaged client computer 102 is a video game console that connects to a frontend game server. The unmanaged client computer 102 is connected to the frontend server 110 via a local area network (LAN) or other similar network 108.

In some embodiments, the network 108 communicates traditional block I/O over, for example, a storage area network (SAN). In some embodiments, the network 108 communicates file I/O, for example, over a transmission control protocol/internet protocol (TCP/IP) network or other network using a similar communication protocol. In some embodiments, the unmanaged client system 100 includes two or more networks 108. Alternatively, the unmanaged client computer 102 connects directly to the frontend server 104 via a backplane or system bus (not shown). In some embodiments, the network 108 includes a cellular network or another similar type of communication and/or data network.

As depicted, the frontend server 110 includes an SPN apparatus 117, a client application 118, a storage device 119 that includes a keytab file 121, a frontend processor 120, and a frontend memory device 122. In one embodiment, the frontend server 110 provides a connection for a user on the unmanaged client 102 to the backend server 112. In some embodiments, the frontend server 110 forwards requests from the user to the backend server 112. In some embodiments, the frontend server 110 uses the client application 118 to allow the user to interface with and connect to the backend server 112. In some embodiments, the client application 118 is stored in the frontend memory device 122 and executed by the frontend processor 120. In one embodiment, the frontend server 110 is an array of servers. Additionally, multiple server instances may execute on a single frontend server 110.

In one embodiment, the frontend processor 120 is a central processing unit (CPU) with one or more processing cores. In other embodiments, the frontend processor 120 is a network processing unit (NPU) or another type of processing device such as a general purpose processor, an application specific processor, a multi-core processor, or a microprocessor. Alternatively, a separate processor may be coupled to the client application 118. In general, the frontend processor 120 executes one or more instructions to provide operational functionality to the frontend server 110. The instructions may be stored locally in the frontend processor 120 or in the memory device 122. Alternatively, the instructions may be distributed across one or more devices such as the frontend processor 120, the frontend memory device 122, or another data storage device.

As depicted, the backend server 112 includes a common network port 124, a multi-SPN apparatus 126, a user interface 128, and a storage device 130 that includes a keytab file 140. Additionally, the backend server 112 includes a login module 132, a web service application 134, a backend processor 136, and a backend memory device 138. In some embodiments, the backend server 112 is a web services server. In some embodiments, the back end server 112 implements one or more office productivity servers, online banking servers, online stock trading servers, military servers, and other similar security-driven network servers. In some embodiments, the backup server 112 is a data storage system for the frontend server 110. In some embodiments, the backend storage device 130 includes multiple RAID disk arrays to store data securely.

In some embodiments, the backend server 112 hosts multiple SPN references for a single web service application 134. In some embodiments, the backend server 112 receives an authentication request from a user on the unmanaged client 102. The backend server 112 may then implement an authentication procedure in response to the authentication request. The authentication procedure allows the user on the unmanaged client computer 102 to log in and gain some level of access to the backend network 116. In some embodiments, the authentication procedure includes a logon process that allows the user to provide an account name and password to verify a user account exists and that the user provides the correct password. In some embodiments, the authentication procedure provides the user a certain level of access control rights and permissions associated with a web service application 134 such as accessible components and tools of the web service application 134, and accessible data associated with a certain user account. In some embodiments, the authentication procedure includes a Java Authentication and Authorization Service (JAAS). In some embodiments, the backend server 112 reads the keytab file 121 and/or 140 and loads the SPN entries in the keytab file 121 and/or 140 for each SPN supported by a web service application 134 on the backend server 112. In some embodiments, the backend server 112 loads the keytab SPN entries from the storage device 130 such as a hard drive into the memory device 138 such as a random access memory (RAM). In some embodiments, the backend server 112 maps at least one web service application 134 to the common network port 124. In some embodiments, the backend server 112 creates a corresponding security context for a specific SPN during processing of the authentication request. The security context includes a security credential. The security credential allows the user to receive a service ticket. The service ticket is created for the unmanaged client computer 102 and/or the backend server 112. The unmanaged client computer 102 presents the service ticket to create a session with a service on the backend server 112, such as the web service application 134. The unmanaged client computer 102 is authenticated on the backend server 112 via the service ticket. When mutual authentication is enabled, the backend server 112 also authenticates to the unmanaged client computer 102. The security credential includes a credential lifetime, or a time period in which the security credential is enabled and active, followed by an expiration, in which the security credential is disabled and deactivated. Authentication fails in response to an attempt to create a session when the security credential is expired. The credential lifetime may be a default time period or may be configured by the administrator. In some embodiments, following the creation of the security context, the backend server 112 directs the DSS 114 to cache the security context according to the predetermined credential lifetime. The security context is cached for future reuse.

In some embodiments, the common network port 124 is configured as a network port to be used by any web service application 134. In some embodiments, the backend server 112 may associate and map an SPN with any network port on the backend server 112. In other words, the backend server 112 may be configured to dynamically map an SPN with any common network port 124.

In one embodiment, the common network port 124 is a port used by two or more web service applications 134. In other words, the common network port 124 is a network port that is shared among several web service applications 134. In some embodiments, the common network port 124 is representative of a plurality of commonly shared network ports. The multi-SPN apparatus 117 and/or 126 allows an administrator to host multiple service principal names (multi-SPN) on the backend server 112 over the common network port 124.

In some embodiments, the SPN apparatus 117 and/or 126 enables the administrator of the backend server 112 to host multiple SPNs on the backend server 112 over a common network port 124. In some embodiments, the SPN apparatus 117 and/or 126 allows an administrator to configure an SPN as part of the security bindings associated with a web service application 134. A binding specifies the communication mechanism to use when talking to an endpoint and indicates how to connect to the endpoint. In this case, the endpoint is the backend server 112 and/or at least one web service application 134 on the backend server 112. The security bindings for the unmanaged client 102 may then be preconfigured to use a specific SPN for accessing the web service application 134 on the backend server 112. In some embodiments, the security binding is a SOAP binding. SOAP is a protocol for exchanging XML-based messages over computer networks. There are several different types of messaging patterns in SOAP, but one common pattern is the remote procedure call (RPC) pattern, in which the unmanaged client 102 sends a request message to the backend server 112 through the frontend server 110, and the backend server 112 sends a response message to the unmanaged client 102.

In some embodiments, the SPN apparatus 117 and/or 126 allows an administrator to configure an SPN as part of a login module 132. In some embodiments, the backend server 112 hosts multiple instances of a login module 132. Each login module 132 is configured with a different login module SPN. Each web service application 134 on the backend server 112 may then be configured to use a given login module 132 and thereby utilize the login module SPN associated with that login module 132. In some embodiments, the SPN apparatus 117 and/or 126 allows an administrator to configure an SPN as a default entry in a keytab file 121 and/or 140. The keytab file 121 and/or 140 allows an administrator to manage SPNs and keys stored in the keytab file 121 and/or 140, including adding, removing, and modifying SPNs in the keytab file 121 and/or 140. Multiple SPNs and keys may be stored in the keytab file 121 and/or 140 on the backend server 112. In some embodiments, the SPN apparatus 117 and/or 126 designates the first SPN listed in the keytab file 121 and/or 140 as a default SPN. In some embodiments, the SPN apparatus 117 and/or 126 maps a particular SPN to at least one of the web service applications 134 on the backend server 112.

In some embodiments, the user interface 128 allows an administrator and/or a user to interface with the backend server 112. In some embodiments, the user interface 128 provides the administrator a graphical interface that allows the administrator to configure security settings associated with the backend server 112. In some embodiments, the user interface 102 allows the administrator to save the security settings in the memory device 138 and or storage device 130. In some embodiments, the administrator, through a secure connection or direct connection such as a configuration port on the backend server 112 (not shown), enters an SPN through the user interface 128 of the backend server 112 and stores the SPN on the backend storage device 130. In some embodiments, the user interface 102 allows the administrator to enable operations and features of the backend server 112. In some embodiments, the user interface 128 allows the user to interface with the operations and functions of a web service application 134 on the backend server 112.

In some embodiments, the storage device 130 is a persistent memory device or secondary storage device such as a hard drive or a flash drive. In some embodiments, the storage device 130 stores at least one web service application 134 on the backend server 112.

In some embodiments, the login module 132 is an interface implemented by the backend server 112 for authentication procedures. In some embodiments, the login module 132 is an applet executed on the backend server 112 by the backend processor 136. In some embodiments, the login module 132 is a Java applet that is plugged in under a particular web service application 134 on the backend server 112 to provide a particular type of authentication for that web service application 134. In some embodiments, at least one login module 132 is plugged in under a web service application 134. In some embodiments, one login module 132 is plugged in under several different web service applications 134 on the backend server 112.

In some embodiments, the web service application 134 is a kerberized application. A kerberized application is an application protected with kerberos security. A web service application 134 protected with kerberos security implements an authentication procedure to allow a user on the unmanaged client computer 102 to connect to the backend server 112 and gain a certain level of authorization on the backend server 112 associated with at least one web service application 134 on the backend server 112. In some embodiments, the web service application 134 is provided to the user using multiple backend servers 112 with redundant data. In some embodiments, a single web service application 134 is provided by multiple backend servers 112 such as a server farm of backend servers 112.

In one embodiment, the backend processor 136 is configured to execute commands and applications associated with the backend server 112 and/or a web service application 134. In some embodiments, the backend processor 136 executes commands and applications associated with the SPN apparatus 117 and/or 126, the user interface 128, and the login module 132.

In one embodiment, the backend processor 136 is a central processing unit (CPU) with one or more processing cores. In other embodiments, the backend processor 136 is a network processing unit (NPU) or another type of processing device such as a general purpose processor, an application specific processor, a multi-core processor, or a microprocessor. In general, the backend processor 136 executes one or more instructions to provide operational functionality to the backend server 112. The instructions may be stored locally in the backend processor 136 or in the backend memory device 138. Alternatively, the instructions may be distributed across one or more devices such as the backend processor 136, the backend memory device 138, or another data storage device.

As depicted, the DSS 114 includes a key distribution center (KDC) 142, and a DSS memory device 144. The DSS memory device 144 includes a user registry 146. In some embodiments, the DSS 114 implements a directory service (DS) in association with an authentication procedure. A DS is a software application, or a set of applications, that stores and organizes information about a computer network's users and network resources such as those of the backend network 116. The DS allows an administrator to manage user access to the resources, such as the web service application 134. Additionally, the DS acts as an abstraction layer between the user and the web service application 134. The DSS 114 acts as a central authority in the authentication procedure to allow a user to securely authenticate a user account and gain some level of access to the system resources of the backend server 112, including the web service application 134. In some embodiments, the DSS 114 implements a Lightweight Directory Access Protocol (LDAP). LDAP is an application protocol for querying and modifying directory services running over TCP/IP. In some embodiments, the DSS 114 includes Active Directory (AD). AD is an implementation of an LDAP directory service for use in Windows environments. In some embodiments, the user account is associated with an authorization level. The authorization level of the user account determines the level of access granted to the user in association with the backend end network 116, a web service application 134, and/or the backend server 112.

WS-SecurityKerberos provides a point-to-point security framework wherein the web service client 102 acquires a unique "ticket" from the KDC 142. The ticket from the KDC 142 is used to establish a secure channel between the unmanaged client computer 102 and the backend server 112. The unmanaged client computer 102 tells the KDC 142 which provider he wants to contact by specifying a Service Principal Name (SPN) of the backend server 112. The ticket which is generated by the KDC 142 can only be decrypted by the backend server 112 whose SPN was used to generate the ticket. In some embodiments, the information about the user associated with the backend server 112 is stored and organized in a user account associated within the user registry 146.

In some embodiments, the frontend server 110, the backend server 112, and the DSS 114 communicate with each other over the backend network 116 and implement authentication procedures according to various network communication protocols. Some of the network communication protocols may include Simple Object Application Protocol (SOAP), Message Transmission Optimization Mechanism (MTOM), XML-binary Optimized Packaging (XOP), Web Services Description Language (WSDL), and Remote Procedure Call (RPC) protocol such as XML-RPC and JavaScript Object Notation (JSON)-RPC.

In some embodiments, the memory devices 122, 138, and 144 are random access memory (RAM) or another type of dynamic storage device. In other embodiments, the memory devices 122, 138, and 144 are read-only memory (ROM) or another type of static storage device. In other embodiments, the illustrated memory devices 122, 138, and 144 are representative of both RAM and static storage memory within an unmanaged client system 100. In some embodiments, the memory devices 122, 138, and 144 are content-addressable memory (CAM). In other embodiments, the memory devices 122, 138, and 144 are an electronically programmable read-only memory (EPROM) or another type of storage device.

Additionally, some embodiments store instructions as firmware such as embedded foundation code, basic input/output system (BIOS) code, cluster optimization code, and/or other similar code.

Figure 2:
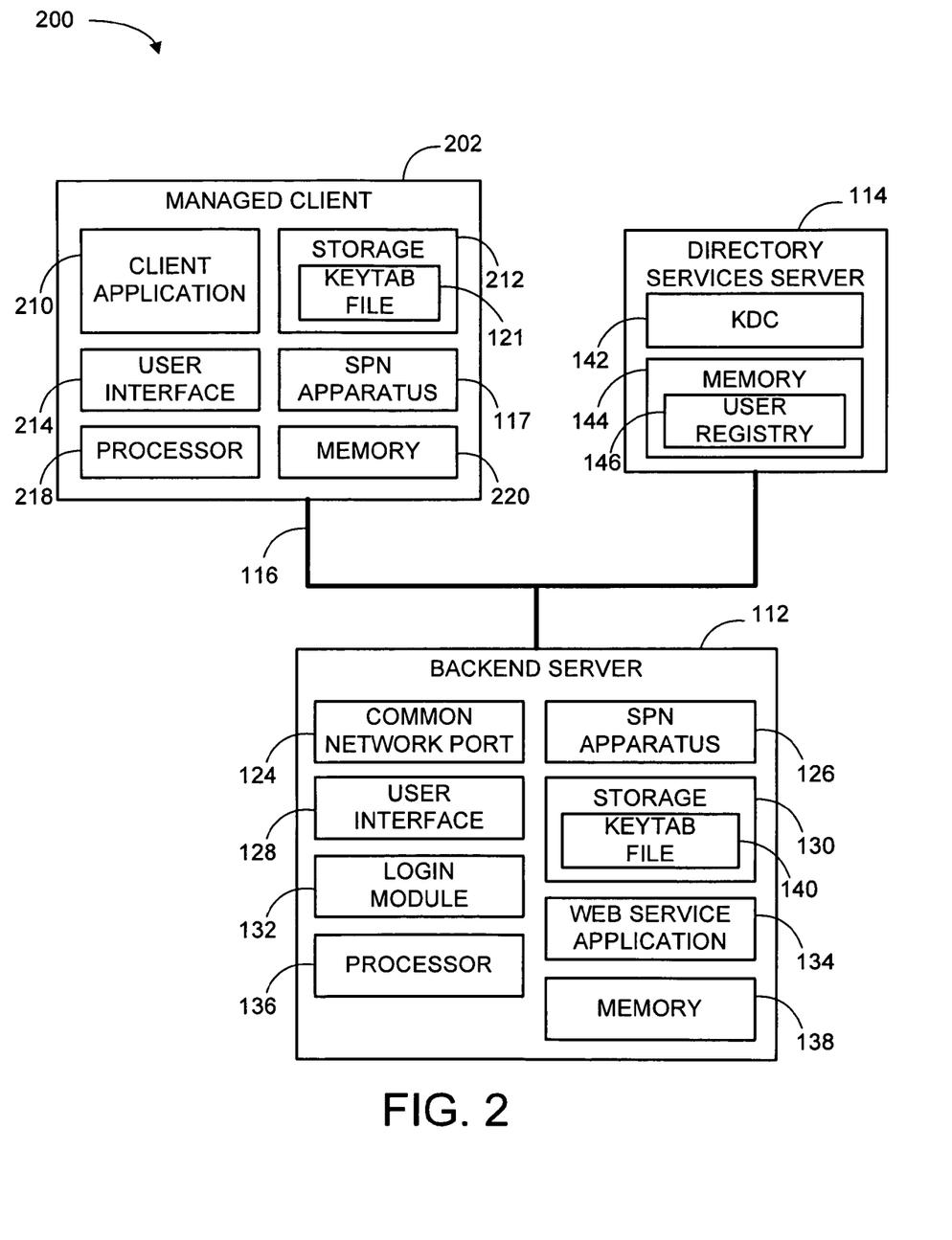
FIG. 2 depicts a schematic block diagram of one embodiment of a managed client system.

FIG. 2 depicts a schematic block diagram of one embodiment of a managed client system 200. The illustrated managed client system 200 includes a managed client 202, a backend server 112, a DSS 114, and a backend network 116. Although the depicted managed client system 200 is shown and described herein with certain components and functionality, other embodiments of the managed client system 200 may be implemented with fewer or more components or with less or more functionality. For example, some embodiments of the managed client system 100 may include a plurality of managed clients 202, a plurality of backend servers 112, and a plurality of backend networks 116. Additionally, some embodiments of the managed client system 200 may include similar components arranged in another manner to provide similar functionality, in one or more aspects.

The depicted managed client (MC) 202 includes an MC client application 210, an MC storage device 212 that includes an MC keytab file 121, an MC user interface 214, an MC SPN apparatus 117, an MC processor 218, and an MC memory device 220. As depicted, the backend server 112 includes a common network port 124, a multi-SPN apparatus 117, a user interface 128, and a storage device 130 that includes a keytab file 121 and/or 140. Additionally, the backend server 112 also includes a login module 132, a web service application 134, a backend processor 136, and a backend memory device 138. As depicted, the DSS 114 includes a key distribution center (KDC) 142, and a DSS memory device 144. The DSS memory device 144 includes a user registry 146. The components depicted in the managed client system 200 and the functions of those components are substantially similar to the components depicted in the unmanaged client system 100 and the functions of those components described above with reference to FIG. 1, except as noted below.

In some embodiments, the MC 202 is a managed desktop environment managed by the backend server 112. In some embodiments, software and applications, including web service applications 134, are deployed and upgraded at the backend server 112 and then downloaded to the managed client 202.

The MC 202 communicates with the backend server 112 over the backend network 116. The MC 202 relies on the backend server 112 for software and applications. In some embodiments, the backend network 116 is a local area network (LAN), wide area network (WAN), metropolitan area network (MAN), and/or another similar network or combination thereof. Thus, the backend server 112 may be located in some near proximity to the managed client 202 on a LAN or at some distance on a WAN or MAN. In some embodiments, the backend network 116 includes a wireless network.

The MC user interface 214 may include a graphics card and display (not shown) to display to the user the software and applications downloaded from the backend server 112 to the MC 202, including web service applications 134. Otherwise, the MC 202 accomplishes most of its processing on the backend server 112.

In some embodiments, the MC 202 reads the MC keytab file 121 and loads the SPN entries in the MC keytab file 121 for each SPN supported by web service applications 134 on the backend server 112. In some embodiments, an administrator configures the MC keytab file 121 stored on the MC 202.

In some embodiments, an administrator manages the MC SPN apparatus 117 on the MC 202 through the backend server 112. In other words, the administrator may log into the backend server 112 and, through the backend server 112, log into the MC 202 to manage and update components of the MC 202 including the MC SPN apparatus 117. In some embodiments, the MC SPN apparatus 117 allows an administrator to configure an SPN as part of the security bindings associated with a web service application 134. The security bindings for the managed client 202 may then be preconfigured to use a specific SPN for accessing a web service application 134 on the backend server 112. In some embodiments, the security binding of the managed client 202 is a SOAP binding.

In some embodiments, the MC SPN apparatus 117 allows the administrator to configure an SPN as a default entry in the MC keytab file 121. The MC keytab file 121 allows the administrator to manage SPNs and keys stored in the MC keytab file 121, including adding, removing, and modifying SPNs in the MC keytab file 121. In some embodiments, the MC SPN apparatus 117 designates the first SPN listed in the MC keytab file 121 as a default SPN. In some embodiments, the MC SPN apparatus 117 maps a particular SPN to one of the web service applications 134 on the backend server 112.

Figure 3:
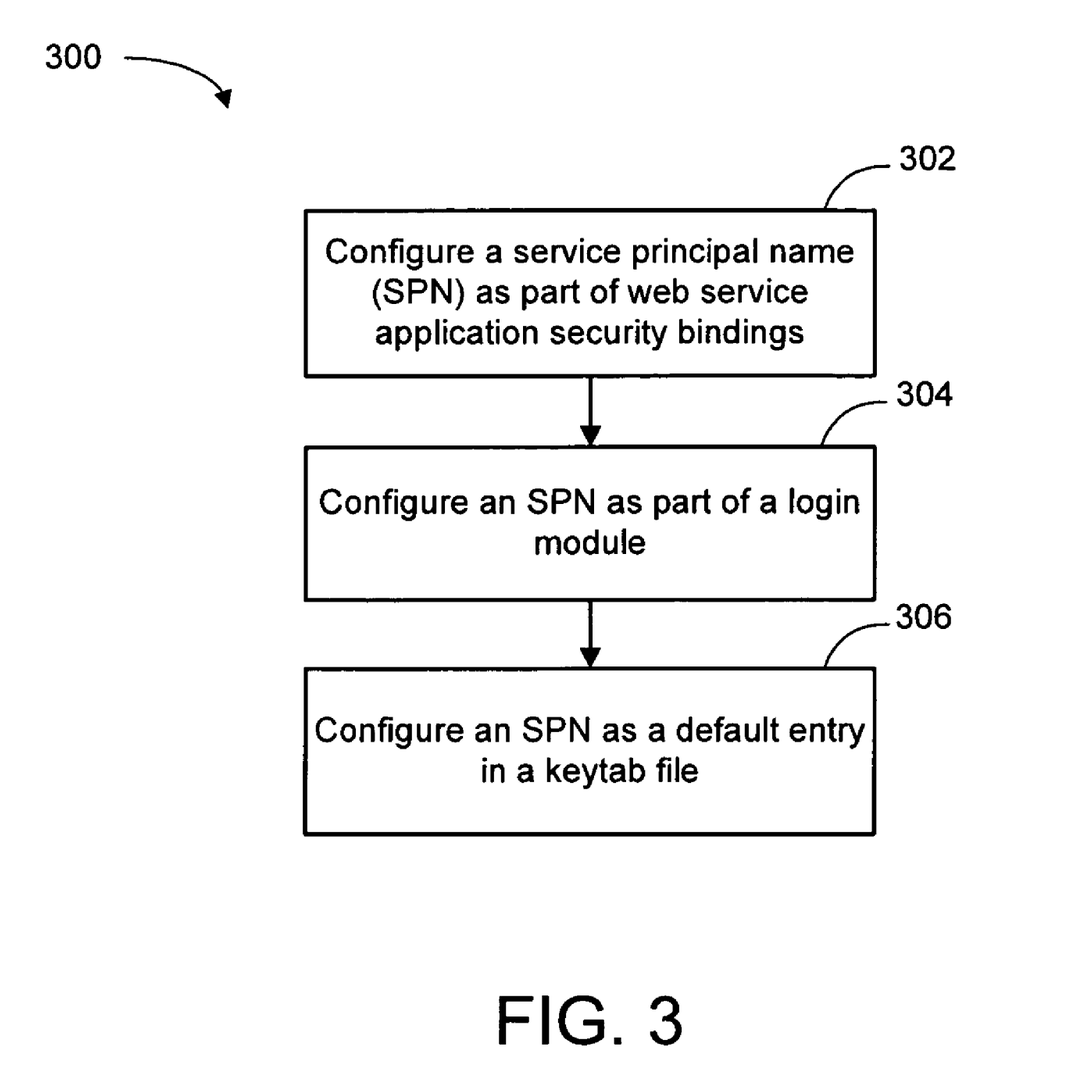
FIG. 3 depicts a schematic flow diagram of one embodiment of a multiple service principle name (multi-SPN) design method.

FIG. 3 depicts a schematic flow diagram of one embodiment of a multiple service principle name (multi-SPN) design method 300. For ease of explanation, the multi-SPN design method 300 is described in conjunction with the SPN apparatus 117 and/or 126 of FIG. 1. However, some embodiments of the multi-SPN design method 300 may be implemented with other SPN apparatuses. Additionally, the multi-SPN design method 300 is described in conjunction with the backend server 112, but some embodiments of the multi-SPN design method 300 may be implemented with other backend servers.

In one embodiment, the SPN apparatus 117 and/or 126 configures 302 a service principal name (SPN) as part of web service application security binding. In some embodiments, the SPN apparatus 117 and/or 126 configures the SPN as part of the web service application security binding. In some embodiments, the SPN apparatus 117 and/or 126 configures 304 an SPN as part of a login module such as the login modules 132. In some embodiments, the SPN apparatus 117 and/or 126 configures 306 an SPN as a default entry in a keytab file such as the keytab file 121 and/or 140.

Figure 4:
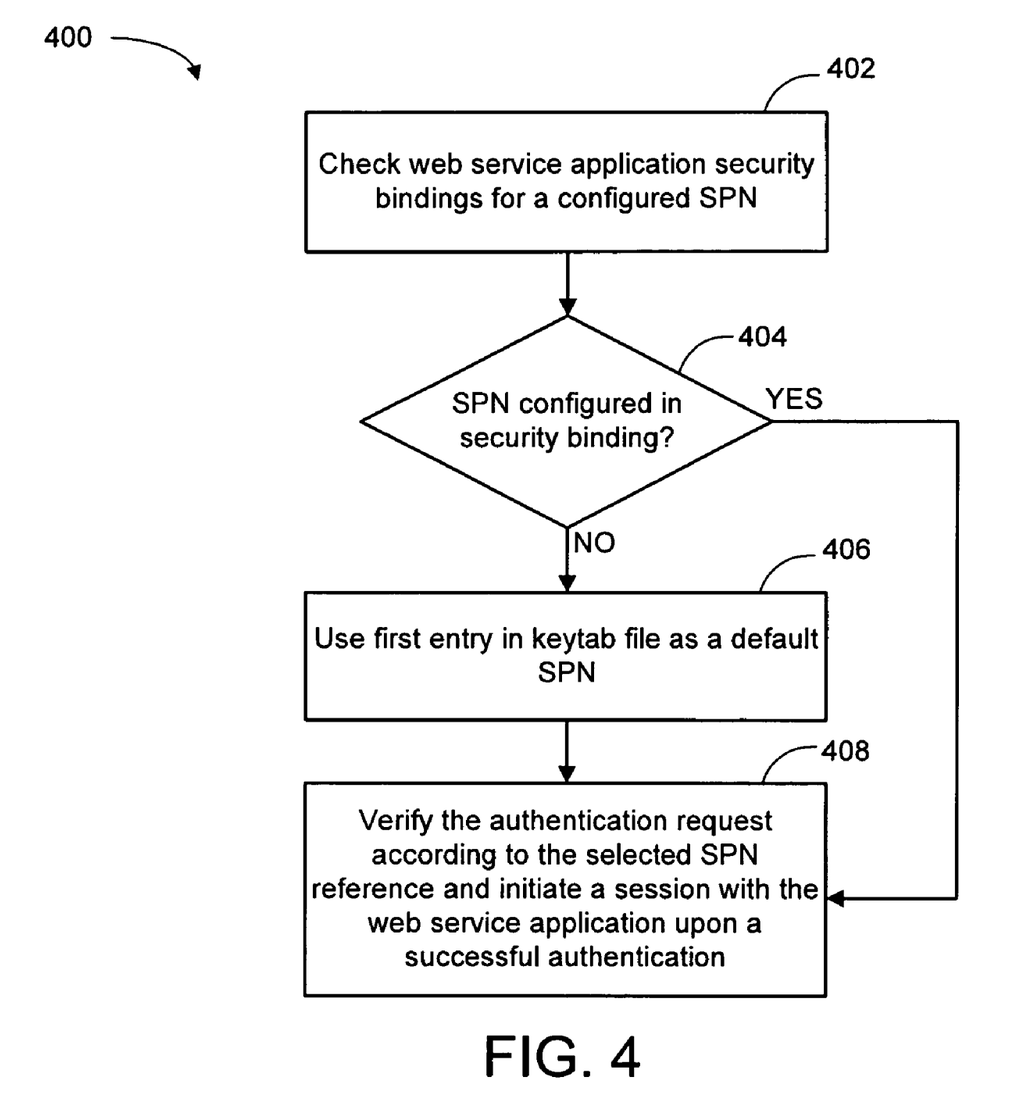
FIG. 4 depicts a schematic flow diagram of one embodiment of a multi-SPN client authentication method.

FIG. 4 depicts a schematic flow diagram of one embodiment of a managed client multi-SPN authentication method 400. For ease of explanation, the managed client multi-SPN authentication method 400 is described in conjunction with the SPN apparatus 117 and/or 126 of FIG. 2. However, some embodiments of the managed client multi-SPN authentication method 400 may be implemented with other SPN apparatuses. Additionally, the managed client multi-SPN authentication method 400 is described in conjunction with the backend server 112, but some embodiments of the managed client multi-SPN authentication method 400 may be implemented with other backend servers.

In one embodiment, the SPN apparatus 117 and/or 126 checks 402 the web service application security bindings for a configured SPN in response to an authentication request from a user on the managed client computer 202. In some embodiments, the SPN apparatus 117 and/or 126 determines 404 whether the SPN is configured in the web service application security binding. If the SPN is configured in the web service application security binding, then the managed client multi-SPN authentication method 400 proceeds to block 408. Otherwise, the managed client multi-SPN authentication method 400 proceeds to block 406.

In one embodiment, the SPN apparatus 117 and/or 126 uses 406 the first SPN entry in the keytab file 121 and/or 140 as a default SPN in the authentication procedure.

In one embodiment, the SPN apparatus 126 verifies 408 the authentication request by the user according to the selected SPN reference from the above described operations and initiates a session with the backend server 112, upon a successful authentication, to execute at least one web service application 134 from the backend server 112.

Figure 5:
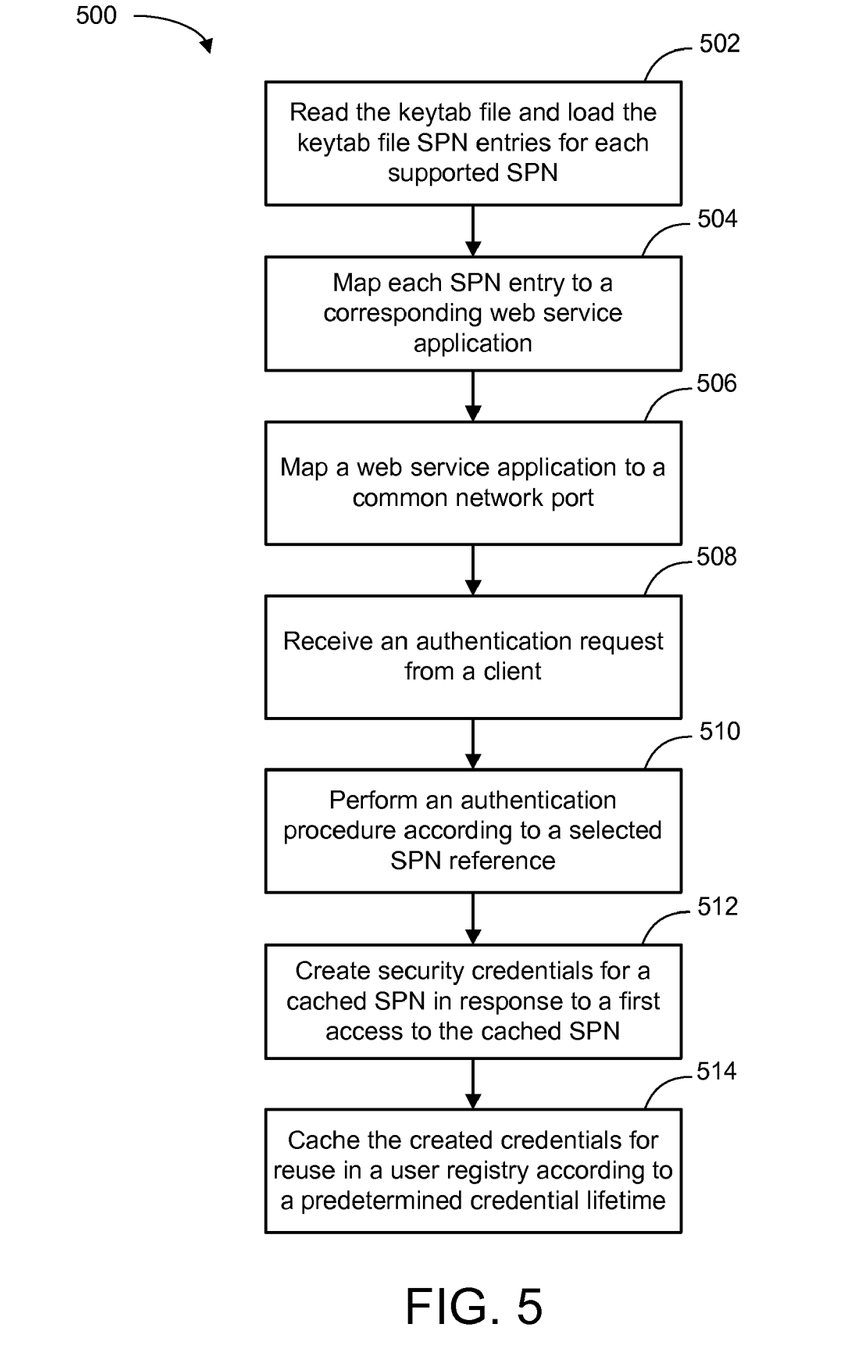
FIG. 5 depicts a schematic flow diagram of one embodiment of a multi-SPN server authentication method.

FIG. 5 depicts a schematic flow diagram of one embodiment of a multi-SPN server authentication method 500. For ease of explanation, the multi-SPN server authentication method 500 is described in conjunction with the SPN apparatuses 117 and/or 126 of FIGS. 1 and 2. However, some embodiments of the multi-SPN server authentication method 500 may be implemented with other SPN apparatuses. Additionally, multi-SPN server authentication method 500 is described in conjunction with the backend server 112, but some embodiments of the multi-SPN server authentication method 500 may be implemented with other backend servers.

In one embodiment, the SPN apparatus 117 and/or 126 reads 502 a keytab file such as the keytab files 121 and/or 140 and loads the keytab file SPN entries for each supported SPN. In some embodiments, the SPN apparatus 117 and/or 126 maps 504 each SPN entry from the keytab file 121 and/or 140 to a corresponding web service application 134.

In one embodiment, the SPN apparatus 117 and/or 126 maps 506 a web service application 134 to a common network port 124. In some embodiments, the SPN apparatus 117 and/or 126 performs operations 502, 504, and 506 as startup and/or initialization operations. In some embodiments, the SPN apparatus 117 and/or 126 receives 508 an authentication request from a user on the unmanaged client computer 102 and/or from a user on the managed client 202.

In one embodiment, the SPN apparatus 117 and/or 126 performs 510 an authentication procedure according to a selected SPN reference. In some embodiments, the authentication procedure includes operations from the unmanaged client multi-SPN authentication method 500 described above with reference to FIG. 5. In some embodiments, the authentication procedure includes operations from the managed client multi-SPN authentication method 400 described above with reference to FIG. 4.

In one embodiment, the SPN apparatus 117 and/or 126 creates 512 security credentials for a cached SPN in response to a first access to the cached SPN. In other words, the SPN used by the client computer 102 and/or 202 and selected in the authentication method 400 and/or 500 is loaded and cached by the backend server 112 upon a successful authentication procedure. In other words, the first time that a cached SPN is used, the security context is created in response to the successful authentication of the user using the cached SPN.

In one embodiment, the SPN apparatus 117 and/or 126 directs the directory services server (DSS) 114 to cache 514 the created security context for reuse in the user registry 146 according to a predetermined credential lifetime.

At least some of the above described embodiments allow an administrator to host multiple service principal names (multi-SPN) on a backend server 112 over a common network port 124. Thus, the web service application 134 has no dependency on a certain port which allows each web service application 134 running on the backend server 112, utilizing the common network port 124, to use a unique SPN. Thus, the web service application 134 is independent of a specific port and a particular web service application 134 on the backend server 112 may use an SPN specific to that particular web service application 134. Overall, the new multi-SPN methodology significantly improves the management of SPNs and web service applications 134. Embodiments of the above described methods eliminate the restriction of web service applications on a common application server having to share the same common SPN/credential.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to host a web service application on a backend server, an operation to configure a plurality of service principal names (SPNs) for the web service application to allow an administrator to host the plurality of SPNs over a common network port of the backend server. The computer program product also includes an operation to configure a security binding SPN as part of a security binding associated with the web service application and to configure another security binding associated with the client to use the security binding SPN for access to the web service application, an operation to configure a login module SPN as part of a login module, and an operation to configure an entry in a keytab file as a default SPN. The keytab file is a file to store SPN entries, and the first SPN listed in the keytab file is designated as the default entry in the keytab file. The computer program product also includes an operation to host multiple instances of a login module and to configure each instance of the login module with a different login module SPN and an operation to configure the web service application to use a predetermined instance of the login module and to utilize the login module SPN associated with the predetermined instance of the login module.

Additionally, the computer program product also includes an operation to read a keytab file having a plurality of service principal names (SPNs) associated with a web service application, an operation to preload information about each SPN in the keytab file that is supported by the web service application, an operation to perform an authentication procedure in response to a reception of an authentication request from a client to access a web service application over a common network port on a backend server, an operation to check the authentication request for a corresponding SPN, and an operation to verify the authentication request according to a selected SPN. The computer program product also includes an operation to check a web service application security binding for a configured security binding SPN in response to the request for authentication from the client, an operation to select the security binding SPN in response to a determination that the security binding is configured as part of a web service application security binding, an operation to check a login module for a configured login module SPN in response to a determination that a security binding SPN is not configured as part of a web service application security binding, an operation to select the login module SPN in response to a determination that the login module is configured as part of the login module. The computer program product also includes an operation to select a default SPN in the keytab file in response to a determination that the login module SPN is not configured as part of the login module and that the security binding SPN is not configured as part of the web service application security binding. The authentication request is verified according to the selected SPN.

Additionally, the computer program product also includes an operation to create a corresponding security context in response to the verification of the authentication request according to the selected SPN reference and an operation to cache the corresponding security context in a memory device for reuse according to a security credential lifetime. The corresponding security context corresponds to the authentication request and the corresponding security context includes a security credential associated with a user account. The security credential lifetime is a predetermined time period in which the security credential is enabled and active.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium to store a computer readable program that, when executed on a computer, causes the computer to perform operations comprising:
    perform an authentication procedure in response to a reception of an authentication request from a client to access a web service application over a common network port of a backend server;
    configure a plurality of service principal names (SPNs) for the web service application to allow an administrator to host the plurality of SPNs over the common network port of the backend server;
    check the authentication request for a corresponding SPN; and
    verify the authentication request according to a selected SPN.

2. The computer program product of claim 1, wherein the computer readable program, when executed on the computer, causes the computer to perform operations to configure a security binding SPN as part of a security binding associated with the web service application and to configure another security binding associated with the client to use the security binding SPN for access to the web service application.

3. The computer program product of claim 1, wherein the computer readable program, when executed on the computer, causes the computer to perform operations to configure a login module SPN as part of a login module.

4. The computer program product of claim 1, wherein the computer readable program, when executed on the computer, causes the computer to perform operations to configure an entry in a keytab file as a default SPN, wherein the keytab file is a file to store SPN entries, and wherein a first SPN listed in the keytab file comprises the default entry in the keytab file.

5. The computer program product of claim 1, wherein the computer readable program, when executed on the computer, causes the computer to perform operations to host multiple instances of a login module and to configure each instance of the login module with a different login module SPN.

6. The computer program product of claim 5, wherein the computer readable program, when executed on the computer, causes the computer to perform operations to configure the web service application to use a predetermined instance of the login module and to utilize the login module SPN associated with the predetermined instance of the login module.

7. A service principal name (SPN) configuration method comprising:
    performing an authentication procedure in response to a reception of an authentication request from a client to access a web service application over a common network port of a backend server;
    configuring a plurality of SPNs for the web service application to allow an administrator to host the plurality of SPNs over the common network port of the backend server;
    checking the authentication request for a corresponding SPN; and
    verifying the authentication request according to a selected SPN.

8. The SPN configuration method of claim 7, further comprising configuring a security binding SPN as part of a security binding associated with the web service application and to configure another security binding associated with the client to use the security binding SPN for access to the web service application.

9. The SPN configuration method of claim 7, further comprising configuring a login module SPN as part of a login module.

10. The SPN configuration method of claim 7, further comprising configuring an entry in a keytab file as a default SPN, wherein the keytab file is a file to store SPN entries, and wherein a first SPN listed in the keytab file comprises the default entry in the keytab file.

11. The SPN configuration method of claim 7, further comprising:
hosting multiple instances of a login module;
configuring each instance of the login module with a different login module SPN;
configuring the web service application to use a predetermined instance of the login module; and
utilizing the login module SPN associated with the predetermined instance of the login module.

12. A computer program product comprising a non-transitory computer useable storage device to store a computer readable program that, when executed on a processor within a computer, causes the computer to perform operations comprising:
read a keytab file having a plurality of service principal names (SPNs) associated with a web service application;
preload information about each SPN in the keytab file that is supported by the web service application;
perform an authentication procedure in response to a reception of an authentication request from a client to access a web service application over a common network port of a backend server;
check the authentication request for a corresponding SPN; and
verify the authentication request according to a selected SPN.

13. The computer program product of claim 12, wherein the computer readable program, when executed on the computer, causes the computer to perform operations to check a web service application security binding for a configured security binding SPN in response to the request for authentication from the client, wherein the security binding SPN is selected in response to a determination that the security binding SPN is configured as part of the web service application security binding and the authentication request is verified according to the security binding SPN.

14. The computer program product of claim 12, wherein the computer readable program, when executed on the computer, causes the computer to perform operations to check a login module for a configured login module SPN in response to a determination that a security binding SPN is not configured as part of a web service application security binding, wherein the login module SPN is selected in response to a determination that the login module SPN is configured as part of the login module and the authentication request is verified according to the login module SPN.

15. The computer program product of claim 12, wherein the computer readable program, when executed on the computer, causes the computer to perform operations to select a default SPN in the keytab file in response to a determination that a login module SPN is not configured as part of a login module and that a security binding SPN is not configured as part of a web service application security binding, wherein the authentication request is verified according to the default SPN.

16. The computer program product of claim 12, wherein the computer readable program, when executed on the computer, causes the computer to perform operations comprising:
create a corresponding security context in response to the verification of the authentication request according to the selected SPN reference, wherein the corresponding security context corresponds to the authentication request, and wherein the corresponding security context comprises a security credential associated with a user account; and
cache the corresponding security context in a memory device for reuse according to a security credential lifetime, wherein the security credential lifetime is a predetermined time period in which the security credential is enabled and active.

17. A service principal name (SPN) authentication method comprising:
reading a keytab file having a plurality of SPNs associated with a web service application;
preloading information about each SPN in the keytab file that is supported by the web service application;
performing an authentication procedure in response to a reception of an authentication request from a client to access a web service application over a common network port on a backend server;
checking the authentication request for a corresponding SPN; and
verifying the authentication request according to a selected SPN.

18. The SPN authentication method of claim 17, further comprising checking a web service application security binding for a configured security binding SPN in response to the request for authentication from the client, wherein the security binding SPN is selected in response to a determination that the security binding SPN is configured as part of the web service application security binding and the authentication request is verified according to the security binding SPN.

19. The SPN authentication method of claim 17, further comprising checking a login module for a configured login module SPN in response to a determination that a security binding SPN is not configured as part of a web service application security binding, wherein the login module SPN is selected in response to a determination that the login module SPN is configured as part of the login module and the authentication request is verified according to the login module SPN.

20. The SPN authentication method of claim 17, further comprising selecting a default SPN in the keytab file in response to a determination that a login module SPN is not configured as part of a login module and that a security binding SPN is not configured as part of a web service application security binding, wherein the authentication request is verified according to the default SPN.

21. The SPN authentication method of claim 17, further comprising:
creating a corresponding security context in response to a verification of the authentication request according to the selected SPN reference, wherein the corresponding security context corresponds to the authentication request, and wherein the corresponding security context comprises a security credential associated with a user account; and
caching the corresponding security context in a memory device for reuse according to a security credential lifetime, wherein the security credential lifetime is a predetermined time period in which the security credential is enabled and active.

22. An authentication system comprising:
a client computer coupled to a network, the client computer to send an authentication request;
a backend server coupled to the client computer, the backend server to perform an authentication procedure in response to a reception of the authentication request from the client computer to access a web service application over a common network port of the backend server; and a service principal name (SPN) apparatus coupled to the backend server, the SPN apparatus to configure a plurality of service principal names (SPNs) for the web service application to allow an administrator to host the plurality of SPNs on the backend server over the common network port, wherein the authentication system is further configured to:
    check the authentication request for a corresponding SPN; and
    verify the authentication request according to a selected SPN.

23. The authentication system of claim 22, the SPN apparatus further configured to:
    configure a security binding SPN as part of a security binding associated with the web service application;
    configure another security binding associated with the client to use the security binding SPN for access to the web service application;
    configure a login module SPN as part of a login module; and
    configure a default SPN as part of an entry in a keytab file, wherein the keytab file is a file to store SPN entries, and wherein a first SPN listed in the keytab file comprises the default entry in the keytab file.

24. The authentication system of claim 23, the SPN apparatus further configured to:
    check the web service application security binding for the configured security binding SPN in response to the request for authentication from the client;
    select the security binding SPN in response to a determination that the security binding SPN is configured as part of the web service application security binding;
    check the login module for the configured login module SPN in response to a determination that the security binding SPN is not configured as part of the web service application security binding;
    select the login module SPN in response to a determination that the login module SPN is configured as part of the login module; and
    select the default SPN in the keytab file in response to a determination that the login module SPN is not configured as part of the login module and that the security binding SPN is not configured as part of the web service application security binding.

25. The authentication system of claim 24, wherein the backend server is further configured to create a corresponding security context in response to a verification of the authentication request according to the selected SPN reference, wherein the corresponding security context corresponds to the authentication request and to the web service application, and wherein the corresponding security context comprises a security credential associated with a user account.

26. A system comprising:
    means for performing an authentication procedure in response to a reception of an authentication request from a client to access a web service application over a common network port of a backend server;
    means for configuring a plurality of service principal names (SPNs) for the web service application to allow an administrator to host the plurality of SPNs over the common network port of the backend server;
    means for checking the authentication request for a corresponding SPN; and
    means for verifying the authentication request according to a selected SPN.

\* \* \* \* \*